United States Patent
Turchan et al.

[11] Patent Number: 5,964,963
[45] Date of Patent: Oct. 12, 1999

[54] BRAZING PASTE

[76] Inventors: Manuel C. Turchan, 42288 Crestview, Northville, Mich. 48167; Pravin Mistry, 3410 24 Mile Rd. Shelby Rd., Shelby Township, Mich. 48316; Shengzhong Liu, 42735 Boulden Ct., Canton, Mich. 48187

[21] Appl. No.: 08/465,266
[22] Filed: Jun. 5, 1995

Related U.S. Application Data

[60] Division of application No. 08/297,986, Aug. 30, 1994, abandoned, which is a continuation-in-part of application No. 08/296,550, Aug. 25, 1994, abandoned.

[51] Int. Cl.⁶ .................................................. B23K 35/26
[52] U.S. Cl. .......................... 148/22; 75/255; 228/262.9
[58] Field of Search ........................... 75/228, 230, 255; 148/22; 228/262.1, 262.9; 428/546, 402, 698

[56] References Cited

U.S. PATENT DOCUMENTS

| | | | |
|---|---|---|---|
| 4,643,740 | 2/1987 | Nicolson | 428/698 |
| 5,403,375 | 4/1995 | König et al. | 75/255 |
| 5,407,458 | 4/1995 | König et al. | 75/255 |
| 5,441,553 | 8/1995 | Polizzotti et al. | 75/230 |
| 5,474,808 | 12/1995 | Aslam | 427/435 |
| 5,541,006 | 7/1996 | Conley | 428/552 |
| 5,679,445 | 10/1997 | Massa et al. | 428/698 |
| 5,681,653 | 10/1997 | Hammond et al. | 428/698 |
| 5,714,626 | 2/1998 | Abma et al. | 558/264 |
| 5,718,586 | 2/1998 | Sharp et al. | 433/214 |
| 5,731,075 | 3/1998 | Goto et al. | 428/402 |

*Primary Examiner*—George Wyszomierski
*Attorney, Agent, or Firm*—Harness, Dickey & Pierce, P.L.C.

[57] ABSTRACT

Thermal stresses normally associated with brazing are alleviated by a low temperature brazing technique of the present invention. A low-temperature brazing paste, preferably suitable to be melted at temperatures of no greater than 200° C. (e.g., 100–200° C.), containing nanoscale ($\leq 100$ nanometer) size particles of gold, cadmium, copper, zinc, tin, lead, silver, silicon, chromium, cobalt, antimony, bismuth, aluminum, iron, magnesium, nitrogen, carbon, boron, and alloys and composites of these materials, is applied as a bead or as a powder spray at the junction of two components desired to be joined together. Energy from a source such as a laser beam (for example a $CO_2$ laser, an Nd-Yag laser or an excimer laser), flame, arc, plasma, or the like, is "walked" along the brazing material. The energy beam is sufficient to cause melting and re-crystallization of the nanoscale-particle-containing brazing paste. In an exemplary application of the process, blades (vanes) are brazed to the housing and/or to the shroud of an automatic transmission impeller assembly, preferably using the low-temperature brazing paste containing nanoscale ($\leq 100$ nanometer) size particles of gold, cadmium, copper and/or zinc, or other suitable nanoscale brazing materials.

4 Claims, 2 Drawing Sheets

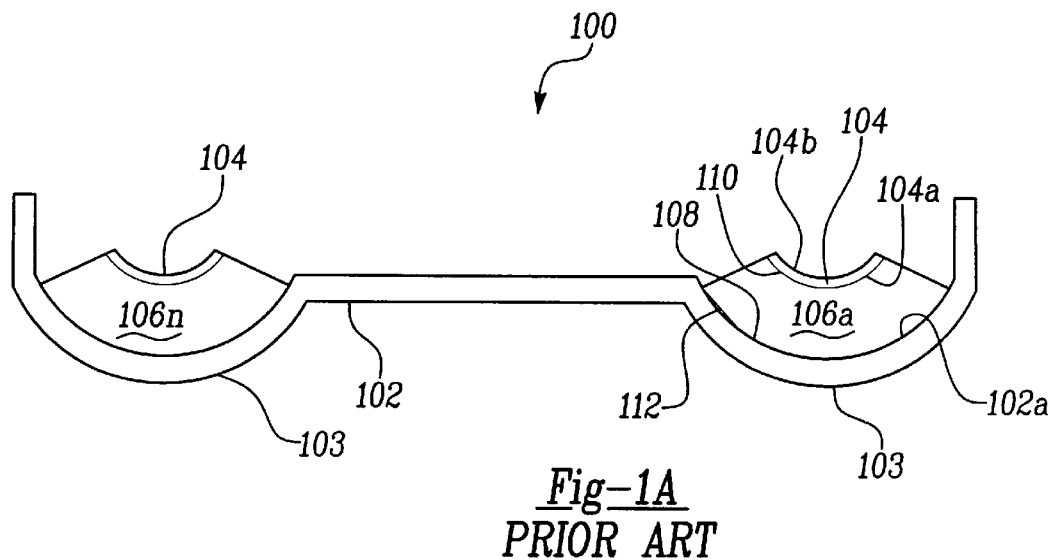
Fig-1A
PRIOR ART
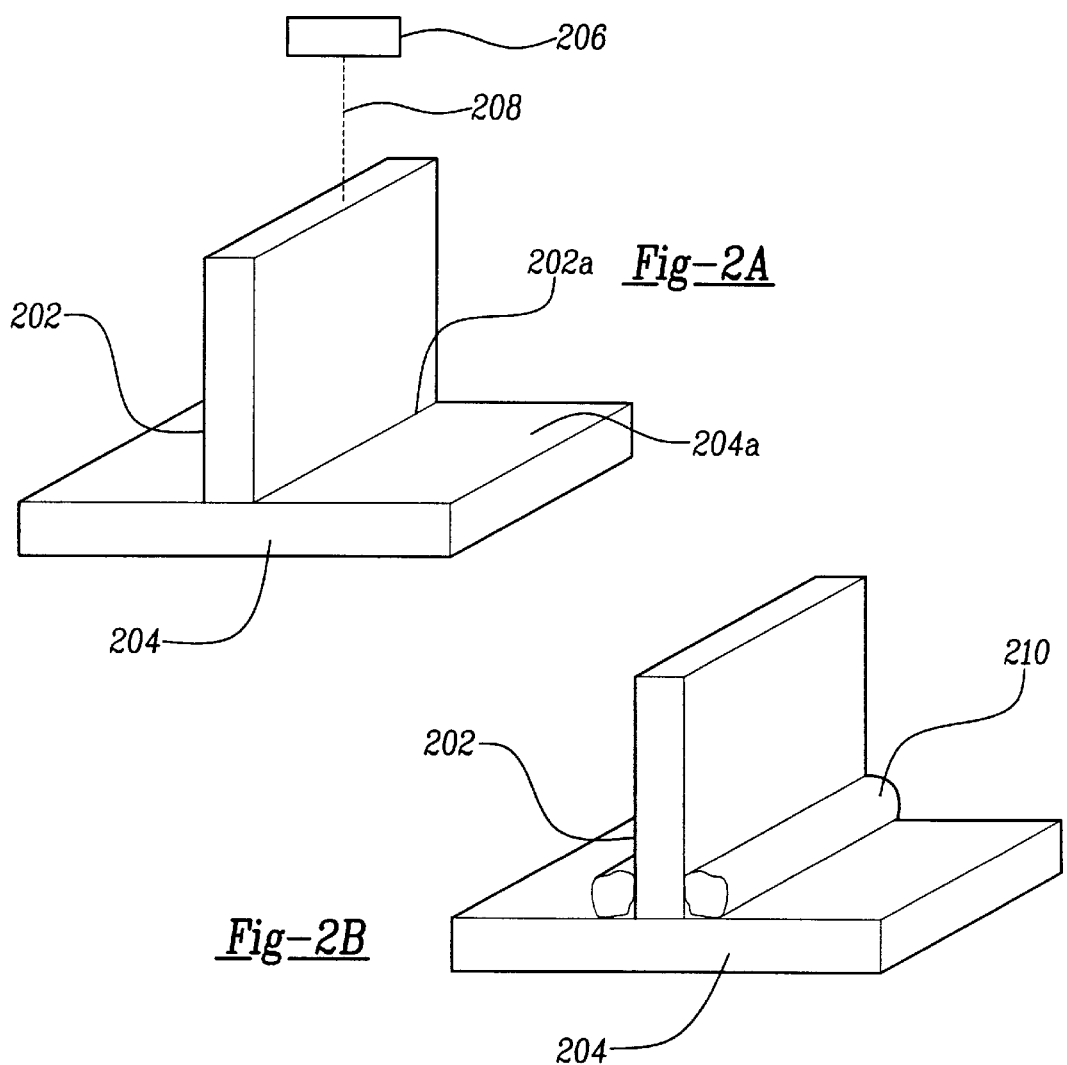
Fig-2A
Fig-2B

BRAZING PASTE

CROSS-REFERENCE TO RELATED CASES

This is a division of commonly-owned U.S. patent application Ser. No. 08/297,986, filed Aug. 30, 1994, now abandoned, which is a continuation-in-part of commonly-owned U.S. patent application Ser. No. 08/296,550, filed on Aug. 25, 1994 by Liu and Mistry, now abandoned.

TECHNICAL FIELD OF THE INVENTION

The invention relates to joining metal components to one another, such as by brazing, soldering or welding.

BACKGROUND OF THE INVENTION

It is generally well known to assemble components together by mechanical means such as tabs and slots. For example, a conventional automotive automatic transmission torque converter includes a turbine assembly that comprises an outer shell (or bowl, or housing) component having slots, an inner shroud component having slots, and a plurality of vane components (blade impellers) having tabs that fit into the slots of and between the shell and shroud components. Such mechanical means for assembling the vanes to the shell and shroud components results in leaks (e.g., of automatic transmission fluid) around the vanes, which reduces the efficiency of the torque converter, and which consequently diminishes (attenuates) the fuel efficiency of the automobile.

U.S. Pat. Nos. 5,180,043, 4,813,522 and 4,765,167 are incorporated by reference herein as representative of the state of the art in assembling components such as the aforementioned automatic transmission components together by mechanical means.

As used herein, the term "joining" includes processes involving heat and/or fusing, such as brazing, welding, bonding and soldering.

Brazing is a well known technique of joining components (e.g., two articles) to one another and generally involves melting a brazing material at temperatures of approximately 1000° C. (one thousand degrees Celsius). The brazing material may be the same as or different in composition from than the material of the joined components. The use of such high temperatures can cause undesirable distortion, annealing, or the like of one or both of the components being joined (e.g., brazed) together.

SUMMARY OF THE INVENTION

It is therefore an object of the present invention to provide an improved technique for joining two components together.

It is another object of the present invention to provide a low temperature technique for brazing components to one another.

It is another object of the present invention to provide a technique for assembling an automatic transmission impeller assembly.

According to the invention, components such as vanes (blades) are joined (e.g., brazed) to components such as housings and shrouds, preferably at low temperatures.

According to an aspect of the invention, a low-temperature brazing paste, preferably suitable to be melted at temperatures of no greater than 200° C. (e.g., 100–200° C.), contains nanoscale ($\leq 100$ nanometer) size particles of gold, cadmium, copper, zinc, tin, lead, silver, silicon, chromium, cobalt, antimony, bismuth, aluminum, iron, magnesium, nitrogen, carbon, boron, and alloys and composites of these materials.

According to an aspect of the invention, an energy beam such as a laser beam (for example provided by a $CO_2$ laser, an Nd-Yag laser, or an excimer laser), flame, arc, plasma, or the like, is "walked" along the brazing material, which may be applied to a junction between two components as a bead, spray or paste.

According to an aspect of the invention, vanes are joined (e.g., brazed) to the housing and/or to the shroud of an automatic transmission impeller assembly, preferably using a low-temperature brazing material (e.g., paste) containing nanoscale ($\leq 100$ nanometer) size particles of gold, cadmium, copper and/or zinc, and the like.

Other objects, features and advantages of the invention will become apparent in light of the following description thereof.

BRIEF DESCRIPTION OF THE DRAWINGS

FIG. 1 is a cross-sectional view of an automatic transmission impeller assembly of the prior art.

FIG. 2A is a perspective view of two components brought together for joining, according to the present invention.

FIG. 2B is a perspective view of the two components of FIG. 2A, with a brazing material disposed at the junction of the two components, according to the present invention.

DETAILED DESCRIPTION OF THE INVENTION

Figure 2C:
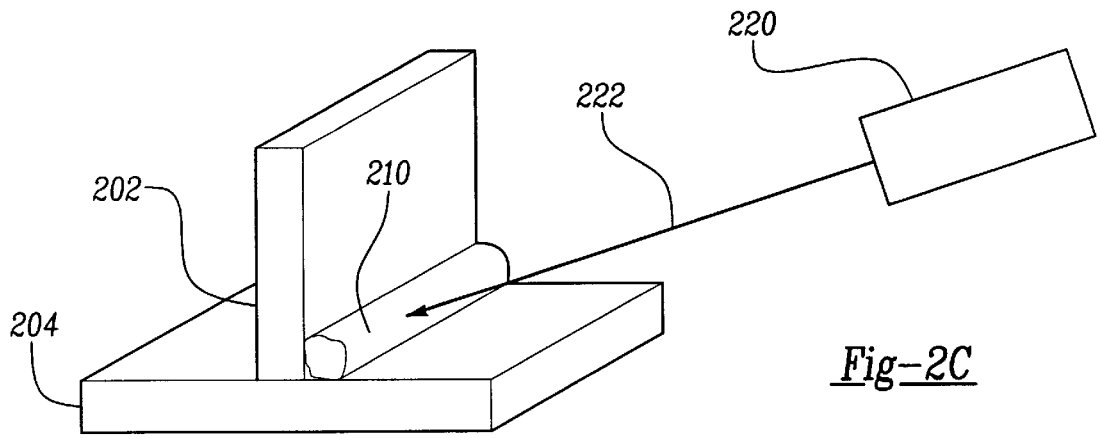
FIG. 2C is a perspective view of the two components of FIG. 2B, with an energy beam directed at the brazing material, according to the present invention.

FIG. 1 illustrates an automatic transmission impeller assembly 100 of the prior art, which includes an outer housing component 102, an inner shroud component 104, and a plurality of blade components 106 (106a . . . 106n). The housing component 102 is bowl-like, as shown. The shroud component 104 is annular, as shown. The blade components 106 are essentially flat and arcuate, each blade having an outer (towards the housing) arcuate edge 108 and an inner (towards the shroud) arcuate edge 110. A peripheral blade-receiving region 103 of the housing component 102 is arcuate, its contour generally corresponding to the contour of the outer edges 108 of the blades 106. The contour of the shroud component 104 corresponds to the contour of the inner edges 110 of the blades 106.

The outer 108 and inner 110 edges of the blades 106 are provided with tabs (not shown) that fit within corresponding slots (not shown) formed in the housing 102 and shroud 104 components, respectively. For example, slots may extend only partially into the inner surface 102a of the housing component 102 for receiving tabs extending from the outer edge 108 of the blade 106, and the slots may extend completely through the shroud component 104 so that tabs extending from the inner edge 110 of the blade may be rolled over on the inner (away from the housing) surface 104b of the shroud. It is intended that the blades 106 fit as securely as possible between the inner surface 102a of the housing component 102 and the outer (towards the housing) surface 104a of the shroud component so that fluid is efficiently impelled by the blades. However, this is difficult (if not impossible) to achieve in practice, and the inevitable gaps between the blades and the housing and shroud components will result in diminished efficiency, in use. In the figure, a stylized gap 112 is shown between the outer edge 108 of the blade and the inner surface 102a of the housing component 102. FIG. 1 is intended to be representative, not comprehensive, of the prior art and is presented to establish a non-limiting context for describing a particular application (usage) of the present invention.

According to the invention, components such as vanes (blades) are joined (e.g., brazed) to components such as housings and shrouds, preferably at low temperatures.

FIGS. 2A, 2B and 2C illustrate the technique of the present invention in a stylized (generalized) manner. According to the invention it is desired to join two components together, such as steel components, without mechanical means such as tabs and slots. To this end, a one of the components 202 is butted up against an other 204 of the components 204 by a suitable positioning (e.g., robotic) mechanism. The dashed line 208 indicates end effectors, linkages, control arms, and the like, for grasping the component 202 for positioning the component with the robotic mechanism 206. In order to effect such positioning, for components of complex geometry (such as the housing 102 of FIG. 1), it is desirable to have a computer (database) "model" of the stationary component (e.g., 204), which may be held in a jig. In this manner, the non-stationary component (202) can be brought into a precise position and orientation with respect to locations on the stationary component (204). It is well within the purview of one having ordinary skill in the art to which this invention most nearly pertains to implement such a positioning mechanism (means).

As shown in FIG. 2A, the components 202 and 204 have been brought together into their desired positional relationship with one another, which is preferably contacting one another (in the figure, an edge 202a of the component 202 is in contact with a surface 204a of the component 204).

In the next step, illustrated in FIG. 2B, a slurry or paste 210 of brazing material is applied to the junction of (at the seam between) the two components 202 and 204. As shown, the brazing material 210 is applied on both sides of the junction, but the brazing material need only be applied to at least one side of the junction (as shown in FIG. 2C). Nanoscale powders disposed in the brazing material (paste) as discussed in greater detail hereinbelow.

In the next step, illustrated in FIG. 2C, an energy source 220 provides an energy beam 222 directed at the brazing material 210 to "melt" the brazing material and cause the two components 202 and 204 to be joined (e.g., brazed).

The energy beam 222 is generated by any suitable means (220) such as a laser (for example a $CO_2$ laser), flame, arc, plasma, or the like, and is preferably controllable (such as with positionable mirrors, nozzles and the like—not shown) to be "walked" along the brazing material 210. (In the case of a flame, arc or plasma, the beam 222 would not be a beam, per se, as it would be in the case of a laser energy source. However, the showing of a beam 222 is illustrative of the "outputs" of these alternative energy sources.) one having ordinary skill in the art to which this invention most nearly pertains will readily understand how to implement such motion control over a suitable energy beam.

The invention takes particular advantage of low-melting temperature brazing materials such as have been disclosed in commonly-owned, copending U.S. patent application Ser. No. (Attorney Docket No. 94-527). These materials include nanoscale ($\leq$100 nanometers) in size particles (powders) of gold, cadmium, copper, zinc, and the like. As noted therein, such nanoscale powders, having a relatively large surface area as compared with their volume, will exhibit a greatly reduced melting temperature. This makes their use ideal for applications where "normal" brazing temperatures would cause undesirable distortion, annealing, or the like of one or both of the components being joined together. Nanoscale powder brazing materials can be melted (recrystallized) to bond (join) the two components together at lower temperatures (i.e., than non-nanoscale materials)—for example, preferably as low as 100–200° C. Such an "order of magnitude" improvement over traditional (high temperature) brazing techniques affords numerous advantages expanding the utility of brazing technology to applications heretofore deemed inappropriate for brazing.

Among the exemplary advantages of using nanoscale materials (i.e., versus non-nanoscale materials) for joining (e.g., brazing) components together is that the smaller size nanoscale materials allow the components being joined to be positioned closer together, which can result in more uniform joining of the components.

It is within the scope of this invention that the brazing material and the beam are applied simultaneously to the junction of the two components being joined together (i.e., rather than sequentially, as implied by FIGS. 2B and 2C). One having ordinary skill in the art to which this invention most nearly pertains will recognize, in light of the teachings contained herein, that nanoscale powders (e.g., gold, cadmium) can be delivered by means of a suitable pressurized nozzle. Evidently, when delivering the powder simultaneously with applying the energy (from the source 220), the powder and the output (222) from the source (220) should both be directed at the same spot to ensure melting of the brazing material.

Figure 3:
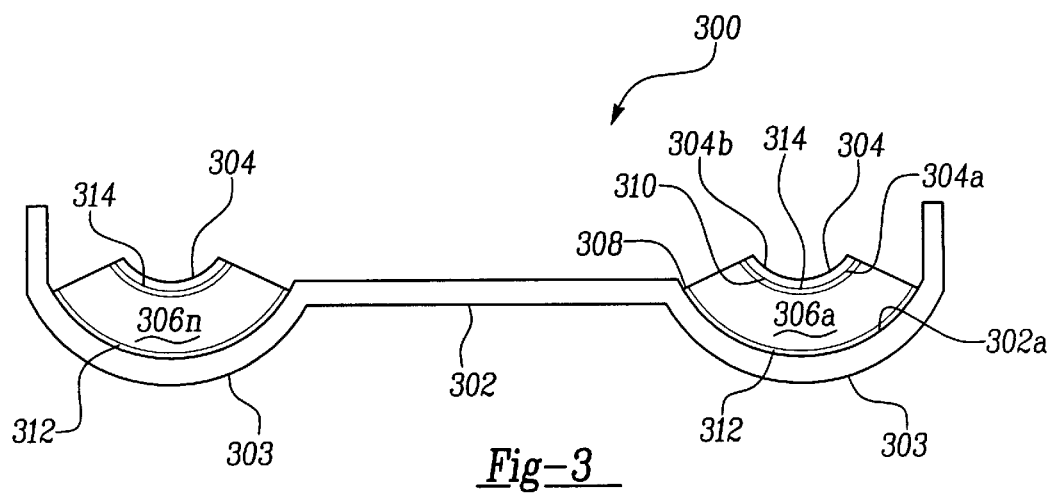
FIG. 3 is a cross-sectional view of an automatic transmission impeller assembly that has been assembled according to the techniques of the present invention.

FIG. 3 illustrates components of an automatic transmission impeller assembly 300, assembled according to the techniques of the present invention, which includes an outer housing component 302, an inner shroud component 304, and a plurality of blade components 306 (306a . . . 306n). The housing component 302 is bowl-like, as shown. The shroud component 304 is annular, as shown. The blade components 306 are essentially flat and arcuate, each blade having an outer (towards the housing) arcuate edge 308 and an inner (towards the shroud) arcuate edge 310. A peripheral blade-receiving region 103 of the housing component 302 is arcuate, its contour generally corresponding to the contour of the outer edges 308 of the blades 106. The contour of the shroud component 304 corresponds to the contour of the inner edges 310 of the blades 306.

In contrast to the impeller assembly 100 of FIG. 1, in the impeller assembly 300 of FIG. 3 the outer 308 and inner 310 edges of the blades 306 need not be provided with tabs that fit within corresponding slots (not shown) formed in the housing (102) and shroud (104) components, respectively. Rather, the blades 306 are formed to fit precisely between the inner surface 302a of the housing component 302 and the outer (towards the housing) surface 304a of the shroud component, and are joined by a braze beads 312 and 314 (compare 210) to the housing 302 and shroud 304 components, respectively, so that fluid is efficiently impelled by the blades. In this manner, there will be no gaps (compare 112) impeding the efficient impelling of transmission fluid, and there will be a corresponding increase in impeller efficiency which will translate to an increase in overall fuel efficiency for an automobile equipped with such a brazed-vane impeller. It is within the scope of this invention that the blades are brazed to one (e.g., housing) of the components and joined by conventional mechanical means (e.g., tabs and slots) to the other (e.g., shroud) of the components of the impeller assembly, and vice-versa.

FIG. 3 is intended to be representative, not comprehensive, of the many and varied application of the techniques of the present invention.

As mentioned above, a laser beam is suitably directed at the brazing material to effect joining of the two components. Since the cross-section and focus of such a beam can be controlled, this allows for localized heating during the joining process. For example, a laser beam having a cross section of 1 mm (one millimeter) is suitable for joining vanes, as described above. Generally lasers operating in the visible and infrared wavelengths are preferred for performing this heating function, ultraviolet lasers not being as efficient for heating and possibly causing undesired deposition sputtering.

Figure 4:
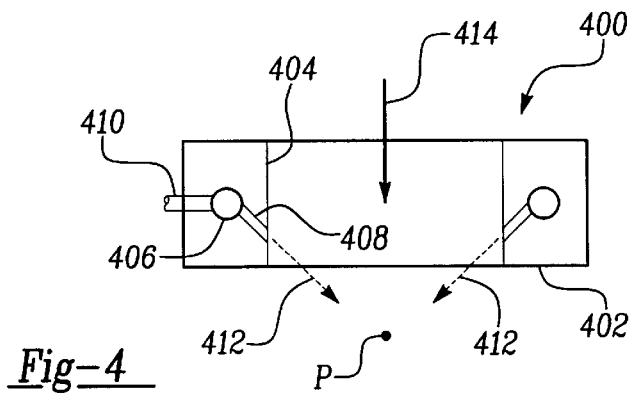
FIG. 4 is a cross-sectional view of a nozzle for delivering brazing material simultaneously with applying an energy source, according to the present invention.

FIG. 4 illustrates a nozzle 400 suitable for simultaneously applying a brazing material to a junction between two components while directing energy from a source (e.g., a laser) at the junction, to join the two components such as by brazing. The nozzle 400 has an annular, ring-like body portion 402 with an opening 404 extending therethrough (from "top" to "bottom"). A runner, or manifold 406 is disposed circumferentially throughout the body portion 402. A plurality (one or more) of output orifices 408 extend from the manifold 406 to the opening 404 at an angle, so as to be directed at (aligned with) a point "P" that is co-axial with, but offset below the nozzle. A single input orifice 410 communicates with the manifold 406 from exterior the nozzle body 402.

In use, material (such as nanoscale brazing material) is supplied to the input orifice 410 of the nozzle from a source (not shown), and is directed at the point "P" as indicated by the dashed line(s) 412. Simultaneously, energy from a source, such as in the form of a laser beam, is directed through the nozzle at the point "P", as indicated by the line 414. In this manner, brazing material (412) can be applied to a specific point (or small area) between two components, simultaneously with being heated to form a joint between the two components. When two or more output orifices 408 are provided, they should be aligned so that brazing material exiting from each output orifice is coincident at the point "P". To form an elongated joint between the two components, the entire nozzle would be moved along the junction of the two components.

Generally, as noted above, the invention contemplates laser joining of two or more articles (components), using a material which may be the same as or different from the articles being joined. Although energy sources other than a laser are discussed, the use of a laser is generally preferred due to the ability to control the beam and consequent ability to localize heating of the junction between the two articles.

Depending upon the application for the joining techniques discussed above, and taking into account concerns that may exist over annealing and/or softening of the articles being joined, the laser operating parameters (e.g., wavelength, focus) can readily be adjusted to suit the application, and the characteristics (e.g., melting point and composition) of the joining material can readily be selected. The joining material may include self-synthetic/reactive materials. Among the advantages of the invention are the ability to exploit material characteristics of the articles being joined to limit adverse heat effects on the material of the articles, while ensuring high tensile strength of the joint being formed, limiting creep, and enhancing corrosion and fatigue resistance.

The joining material (e.g., 210, 312, 314) may be in the form of a gas, a solid, a liquid, or a solid/liquid mix. For joining steel articles, preferred joining materials include aluminum, magnesium, chromium, nitrogen, boron powders, iron, zinc, silicon, copper, silver, carbon, and combinations thereof.

It has been discussed, hereinabove, how the joining material and a laser may be simultaneously introduced to the junction of two components to be joined, and how the combination of joining material and laser may traverse the length of the junction. It is within the contemplated scope of this invention that the combination of joining material and laser not traverse the length of the junction. It may be possible to initiate the joining at one end (of the junction), and then have a continuous reaction extending to the other end of the junction (e.g., by traversing the length of the junction with joining material only, sans continued application of the laser after initiating the reaction).

Where the area to be joined is small (e.g., sub-micron), it may be necessary to use tightly-focused ultraviolet lasers and nanoscale joining materials.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected.

What is claimed is:

1. Brazing paste comprising:
    a self-reactive material, said material including bonding particles having individual sizes of $\leq 100$ nanometer, said particles being selected from the group consisting of gold, cadmium, copper, zinc, tin, lead, silver, silicon, chromium, cobalt, antimony, bismuth, aluminum, iron, magnesium, nitrogen, carbon, and boron, said paste being capable of being melted at temperatures of no greater than 200° C., whereby the self-reactivity of said material is effected by the nanoscale of said bonding particles.

2. The brazing past of claim 1, wherein said paste is capable of being melted at temperatures of between 100° C. and 200°.

3. A brazing paste for joining two or more steel articles, the brazing paste comprising:
    a self-reactive material, said material including bonding particles having individual sizes of $\leq 100$ nanometer, said particles being selected from the group consisting of aluminum, magnesium, chromium, nitrogen, boron powders, iron, zinc, silicon, copper, silver, and carbon, said paste being capable of being melted at temperatures of no greater than 200° C., whereby the self-reactivity of said material is effected by the nanoscale of said bonding particles.

4. The brazing past of claim 3, wherein said paste is capable of being melted at temperatures of between 100° C. and 200°.

\* \* \* \* \*